United States Patent [19]
Humann

[11] Patent Number: 5,283,962
[45] Date of Patent: Feb. 8, 1994

[54] PORTABLE CALF DRYER APPARATUS

[76] Inventor: Ruben W. Humann, Rte. 1, Box 56, Hazelton, N. Dak. 58544

[21] Appl. No.: 64,272

[22] Filed: May 20, 1993

[51] Int. Cl.$^5$ ............................................. F26B 25/06
[52] U.S. Cl. ........................................ 34/202; 119/19; 119/15
[58] Field of Search .................... 34/202, 218, 219; 119/19, 15

[56] References Cited

U.S. PATENT DOCUMENTS

| | | | |
|---|---|---|---|
| 3,175,534 | 3/1965 | Pollard | 34/202 X |
| 4,055,002 | 10/1977 | Roberts | 34/202 |
| 4,314,410 | 2/1982 | Nichols | 34/202 |
| 4,559,903 | 12/1985 | Bloom et al. | 34/202 |

Primary Examiner—Henry A. Bennet
Attorney, Agent, or Firm—David A. Lingbeck

[57] ABSTRACT

The present invention relates to a portable calf dryer apparatus comprising a wheeled container having two compartments, a calf-receiving compartment for drying and warming a calf and a heater unit-storing compartment separate from the calf-receiving compartment for housing either a battery-operated or electrically-powered heater unit means which generates heated air which passes through a vent into the calf-receiving compartment to dry and warm the calf therein and for separating the calf from the heater unit means so that the calf isn't burned by the heater unit means. The apparatus further comprises a removable bottom wall which functions as a tray to receive the dropping from the calf, which drops through a mesh-like platform removeably suspended inside the calf-receiving compartment, upon which a calf is placed for drying and warming to regain its energy, and also comprising a canvas hood removeably mounted above the calf-receiving compartment to retain the heated air inside the compartment and to shelter the calf from the elements of the environment while the calf dries and warms. The portable calf dryer apparatus can be operatively used at and conveniently moved to any located as desired by the user.

6 Claims, 6 Drawing Sheets

PORTABLE CALF DRYER APPARATUS

BACKGROUND OF THE INVENTION

This invention relates to a portable calf dryer apparatus for drying in particular new-born calves and calves infected with disease which dehydrates the calves, to restore energy to the calves.

Veterinarians have documented that, to have healthy calves, new-born calves should be drinking milk from the mother cows within four hours of birth. New-born calves covered with their after-birth and wet from lying upon the snow-covered ground remain in fetal positions a lot longer than if they are dried after which they are more apt to stand on their legs and feed from the mother cows. The prior art describes mainly stationary structures which enclose about the animal causing anxiety to the animal and also describes apparatuses which need to be connected to an outside dryer units which are not conveniently contained within the dryer apparatuses.

One known prior art is a PET DRYING ENCLOSURE, U.S. Pat. No. 3,596,636, comprising a piped base member hingedly connected near a center thereof, a collapsible drying case connected to the piped base member and forming an enclosure in which the animal is placed for drying.

Another known prior art is an ANIMAL DRYER, U.S. Pat. No. 4,314,410, comprising an enclosure having a lower section having a floor and side walls and conduit means extending through a wall thereof, through which heated air is forced into the interior of the enclosure, and further having an upper cage-like section to enclose over the animal, and further having an inner housing having a plurality of perforations through a floor thereof, through which heated air enters the inner housing to dry the animal.

Another known prior art is a PET DRYER APPARATUS, U.S. Pat. No. 5,025,572, comprising a rigid planar platform and legs supporting said platform, and comprising a rigid framework extending above and over the platform, and comprising a transparent cover sheet surrounding and enclosing about the framework, and comprising a positioning seat and strap to effectively sedate the animal, and comprising a ventilation port extending upward through the platform, through which heated air is forced from an outside drying unit connected to the ventilation port via a tube.

As such, none of the prior art is portable, has animal droppings disposal means, is constructed to protect the animal from environmental conditions, necessarily contains a batterypowered or electrically-powered space heater contained therein, and has an easily removable cover, all of which describe the present invention. There is a definite need for a new and better dryer apparatus designed specifically for drying calves.

SUMMARY OF THE INVENTION

This invention relates to a calf dryer apparatus primarily used to dry, warm, and energize new-born calves and calves which are sick. The calf dryer apparatus comprises a durably-constructed container preferably made of metal and having two compartments therein, one for the calf and the other for the heater unit, each having two side walls, a front end wall, and a back end wall with the calf-receiving compartment having a removable bottom wall which functions as a tray and having an open top and with the heater unit-storing compartment having a bottom wall and an open top and further having a back end wall in common with the front end wall of the calf-receiving compartment and further having a lid hingedly attached thereupon; a wheeled means near the rear of the dryer apparatus to easily transport the apparatus; a handle member fixedly attached to the exterior of the front wall for pulling or pushing the dryer apparatus about; a removable mesh-like platform upon which the calf lies or stands; a heat vent from the heater unit-storing compartment to the calf-receiving compartment; and two leg members near the front of the dryer apparatus. Heated air is generated by the heater unit means and passes through a vent in the wall separating the two compartments and dries a calf lying or standing upon the mesh-like platform.

It is an object of the present invention to provide a calf dryer apparatus which is portable and can be easily transported to remote locations such as the pastures on farms.

Another object of the present invention is to provide a calf dryer apparatus which is durable and can withstand the harsh elements of the environment and can effectively shelter the calf from the harsh elements of the environment while the calf is being dried and warmed.

Also, another object of the present invention is to provide a calf dryer apparatus which has a conveniently separated compartment for storing and using a space heater to dry and warm the calf.

Further, another object of the present invention is to provide a calf dryer apparatus which has a raised mesh-like platform which allows the droppings from the calf to drop through the platform so that the calf doesn't lie in the droppings.

Also, another object of the present invention is to provide a calf dryer which has a removable tray or bottom wall to easily clean away the droppings from the calf.

Further, another object of the present invention is to provide a calf dryer apparatus which is fully self-contained without having to attach hoses, tubes or the like to air ducts to drive heated air through the ducts.

Yet, another object of the present invention is to provide a calf dryer apparatus which has an easily attachable and removable hood to further shelter the calf from the elements of the environment.

Further objects and advantages of the present invention will become apparent as the description proceeds and when taken in conjunction with the accompanying drawing wherein:

DETAILED DESCRIPTION OF THE INVENTION

Figure 1:
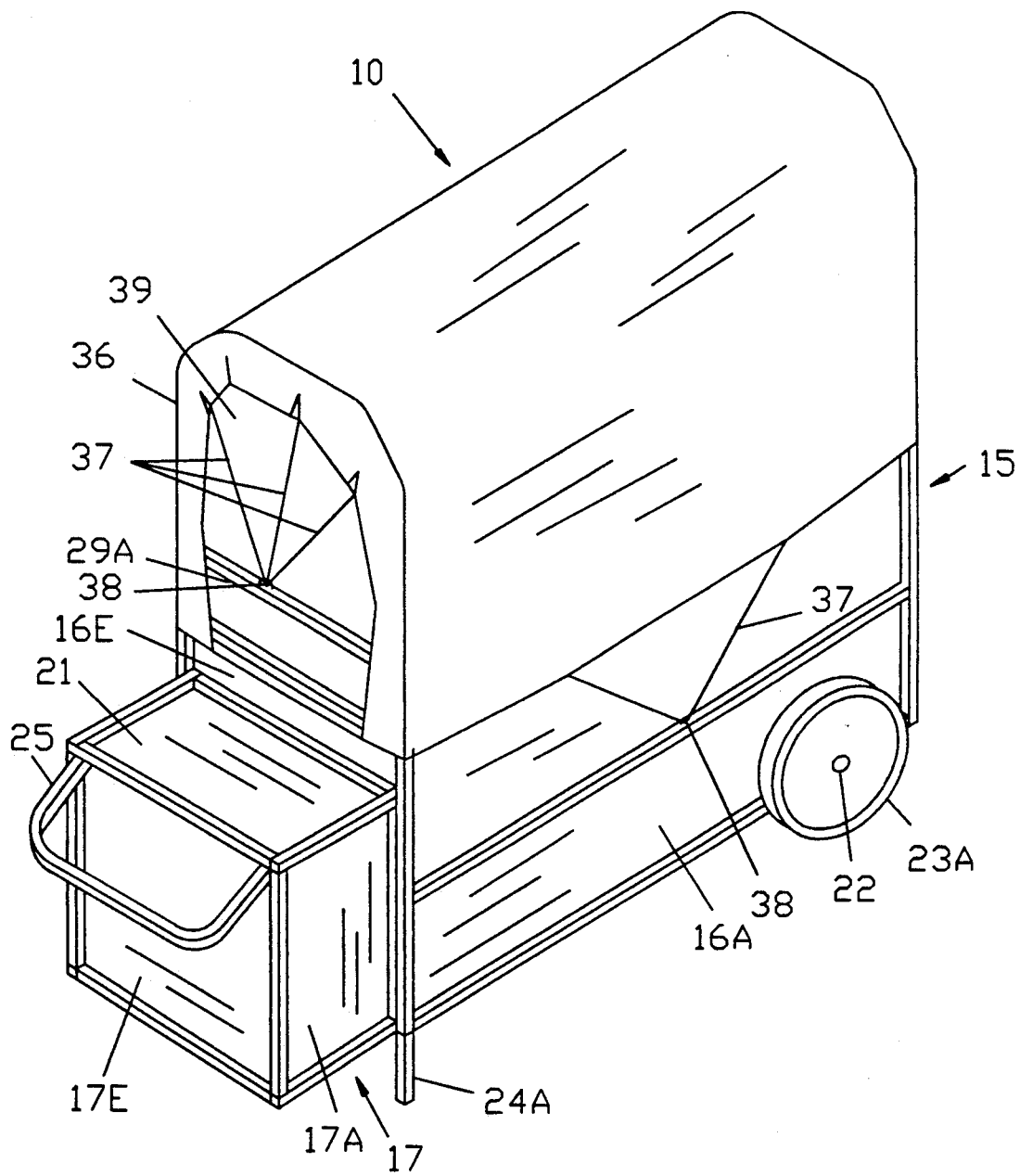
FIG. 1 is a front perspective view of the calf dryer apparatus showing the removable hood attached over the calf-receiving compartment.

Referring to FIGS. 1-6 of the drawing, in particular, the calf dryer apparatus 10 comprises a container 15 preferably made of metal and having two separated compartments, a calf-receiving compartment 16 and a heater unit-storing compartment 17. The calf-receiving compartment 16 comprises two side walls 16a & 16b, a back end wall 16c, a removable bottom wall 16d which functions as a tray, a front end wall 16e, and an open top. The heater unit-storing compartment 17 comprises two side walls 17a & 17b, a front end wall 17c, a bottom wall 17d, an open top, and a back end wall 17e which is in common with the front end wall 16e of the calf-receiving compartment 16. A lid 21, closeable over the top of the heater unit-storing compartment 17, is hingedly attached at one of its ends to the top edge of the heater unit-storing compartment 17, proximate the common wall 16e & 17e separating the two compartments 16 & 17.

As shown in FIGS. 1-3, and 5, the container 15 is securely mounted upon a conventional wagon-like, axle member 22 with two wheels 23a & 23b rotatable mounted upon the ends of the axle member 22 to make the dryer apparatus 10 portable and easily transportable on a ground surface. The axle member 22 is mounted beneath the bottom of the calf-receiving compartment 16 near the back end thereof. Two leg stands 24a & 24b are fixedly attached with set screws (not shown) to the bottom and near the sides of the container 15, below the wall 16e & 17e common to both compartments 16 & 17.

Figure 2:
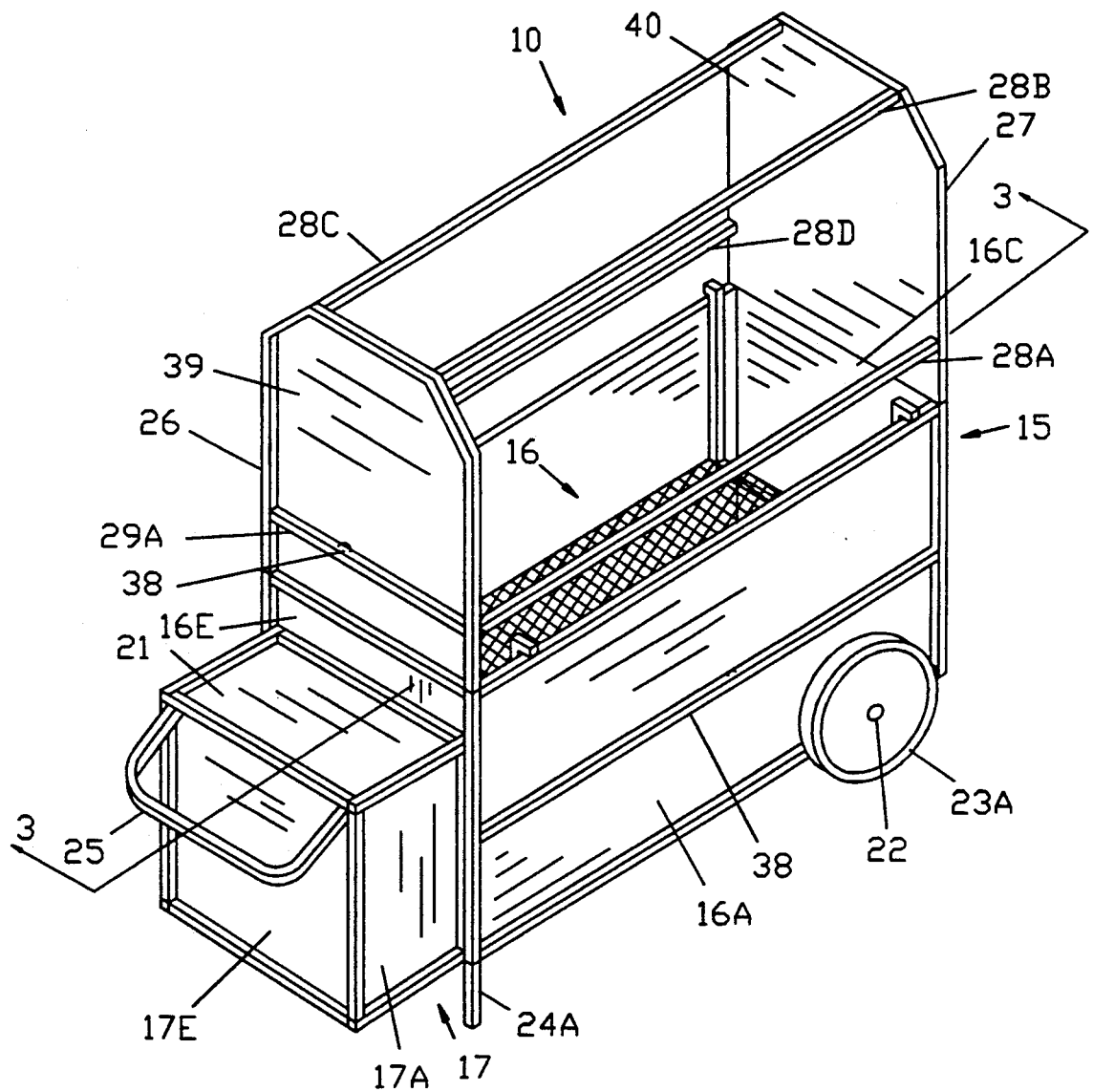
FIG. 2 is a front perspective view of the calf dryer apparatus without the hood attached over the calf-receiving compartment.
Figure 3:
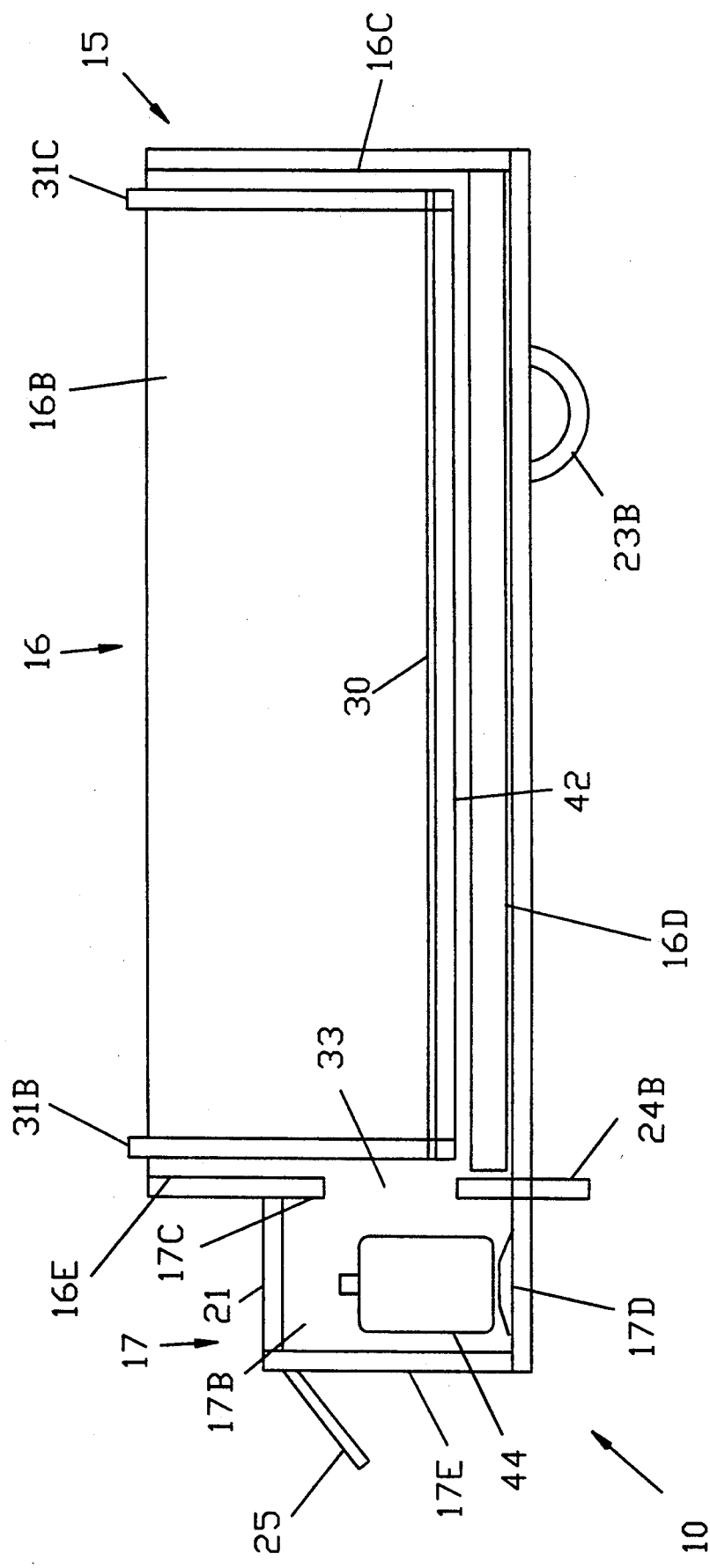
FIG. 3 is a side cross sectional view of the calf dryer apparatus taken along line 3—3 of FIG. 2 showing the positioning of the platform in the calf-receiving compartment and the heater unit in the heater unit-storing compartment.

As shown in FIGS. 1-3, a handle member 25 is fixedly attached with set screws to the exterior of the front end wall 17c of the heater unit-storing compartment 17 to provide the user with a means to easily and conveniently move and position the dryer apparatus 10. The handle member 25 comprises an elongate bar 25a securely attached at its ends to two elongate braces 25b & 25c fixedly mounted to the exterior of the front end wall 17c of the heater unit-storing compartment 17 and having arcuate upper ends which curve away from the container 15 and which are attached to the ends of the elongate bar 25a.

As shown in FIGS. 1-3, and 5, two upright, arch-like frame means 26 & 27 are removeably mounted in spaced-apart slots 41 extending downwardly through the top edge of the container 15 along the top edge of the end walls 16c & 16d of the calf-receiving compartment 16. The two frame means have two crosspiece members 29a & 29b fixedly connected to and traversing between the two arches thereof near the bottoms thereof for stabilizing and strengthening the frame means 26 & 27. Further, two longitudinal members 28a & 28b traverse along and above the top edge along the side walls 16a & 16b of the calf-receiving compartment 16, between the arch-like frame means 26 & 27, and are welded or fixedly attached to the arch-like members 26 & 27 near the bottoms thereof and two longitudinal braces fixedly interconnect the two frame means near the tops thereof, all of which further strengthen and stabilize the frame means 26 & 27. Two panel members 39 & 40 preferably made of galvanized steel and configured similar to the arch-like members 26 & 27 are fixed attached or welded to the arch-like members 26 & 27. A canvas hood 36 is removeably draped over the arch-like frame means 26 & 27 to cover the open top of the calf-receiving compartment 16 to shelter a calf in the calf-receiving compartment 16 from the elements of the environment. Conventional fastener means comprising rubber straps 37 and hooks 38 are attached to the canvas hood 36 and to the container 15 to securely fasten the hood 36 about the arch-like frame means 26 and 27 and panel members 39 and 40 and over the top of the calf-receiving compartment 16.

Figure 4:
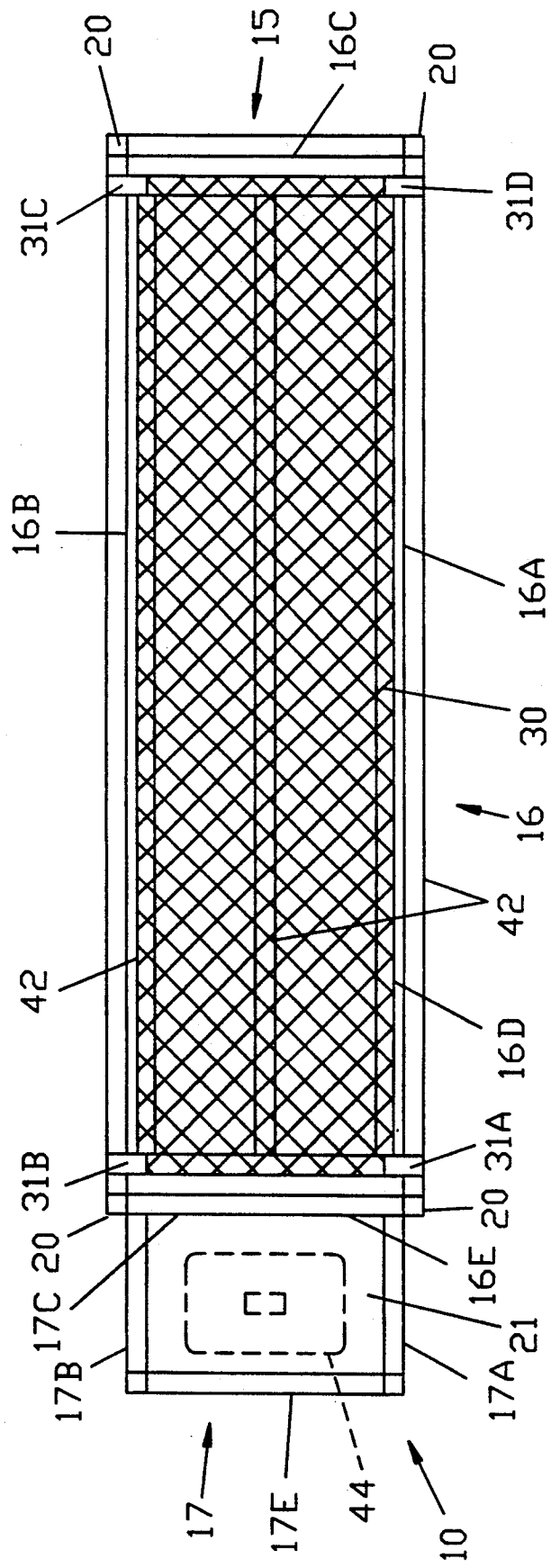
FIG. 4 is a top plan view of the calf dryer apparatus without the hood attached, showing the calf-receiving compartment and the mesh-like platform and showing the heater unit-storing compartment with the lid open.
Figure 6:
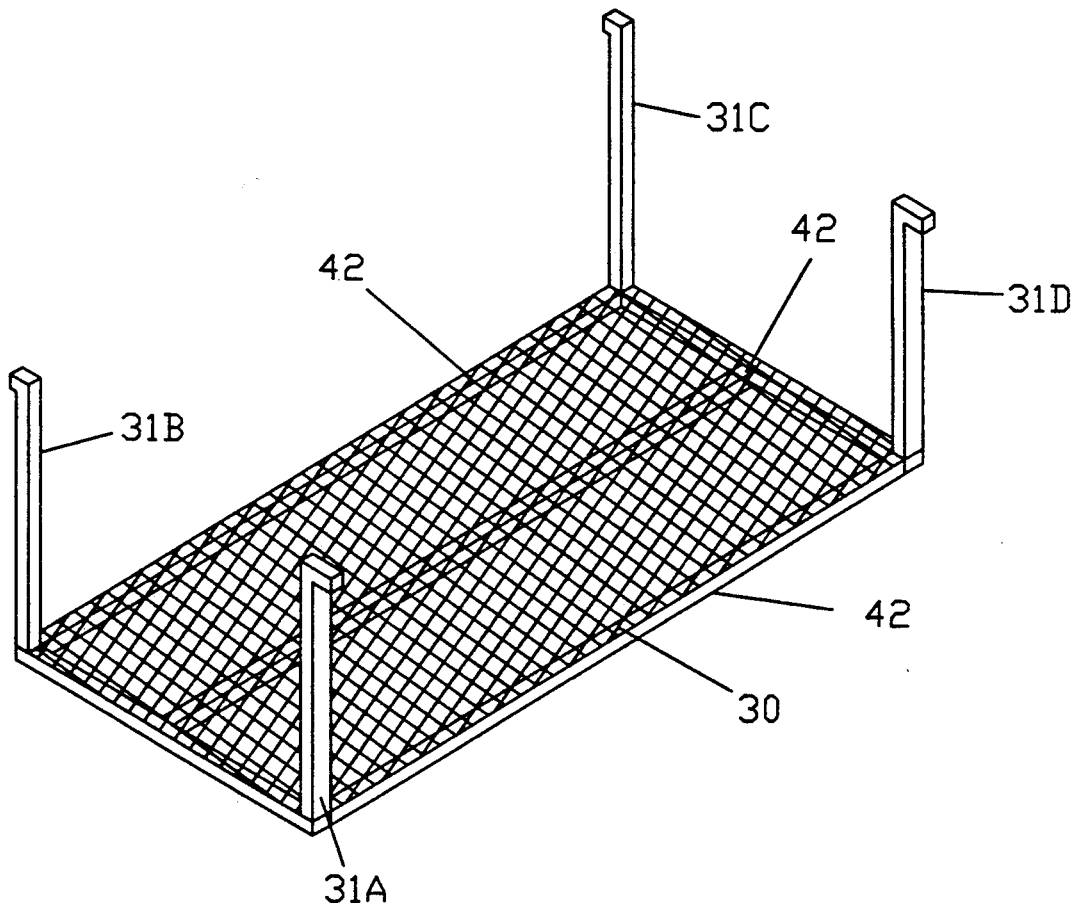
FIG. 6 is perspective illustration of the removable mesh-like platform of the instant invention.

As shown in FIGS. 4 and 6, a mesh-like platform 30 having a frame 42 for strength and support and having four elongate platform-suspending bracket members 31a, 31b, 31c, and 31d fixedly attached or welded to and extending upward from near the corners of the frame 42, is removeably and horizontally suspended inside the calf-receiving compartment 16 by the bracket members 31a, b, c, and d, upon which a calf can be placed to dry and warm. The mesh-like platform 30 can be inserted in the calf-receiving compartment 16 through the open top thereof. The platform-suspending bracket members 31a, 31b, 31c, and 31d each having a curved top end, support the platform 30 by engageably hooking about the top edge along the side walls 16a & 16b of the calf-receiving compartment 16. The platform 30 is suspended in the calf-receiving compartment 16, preferably about thirteen inches from the top thereof so that the calf is generally protected by the walls of the compartment 16 from the cold or other harsh elements of the environment. As the calf is being dried and warmed, the droppings from the calf drop through the mesh-like platform 30 to the bottom wall 16d of the compartment 16 so that the calf doesn't lie in the droppings and dries and warms faster.

Figure 5:
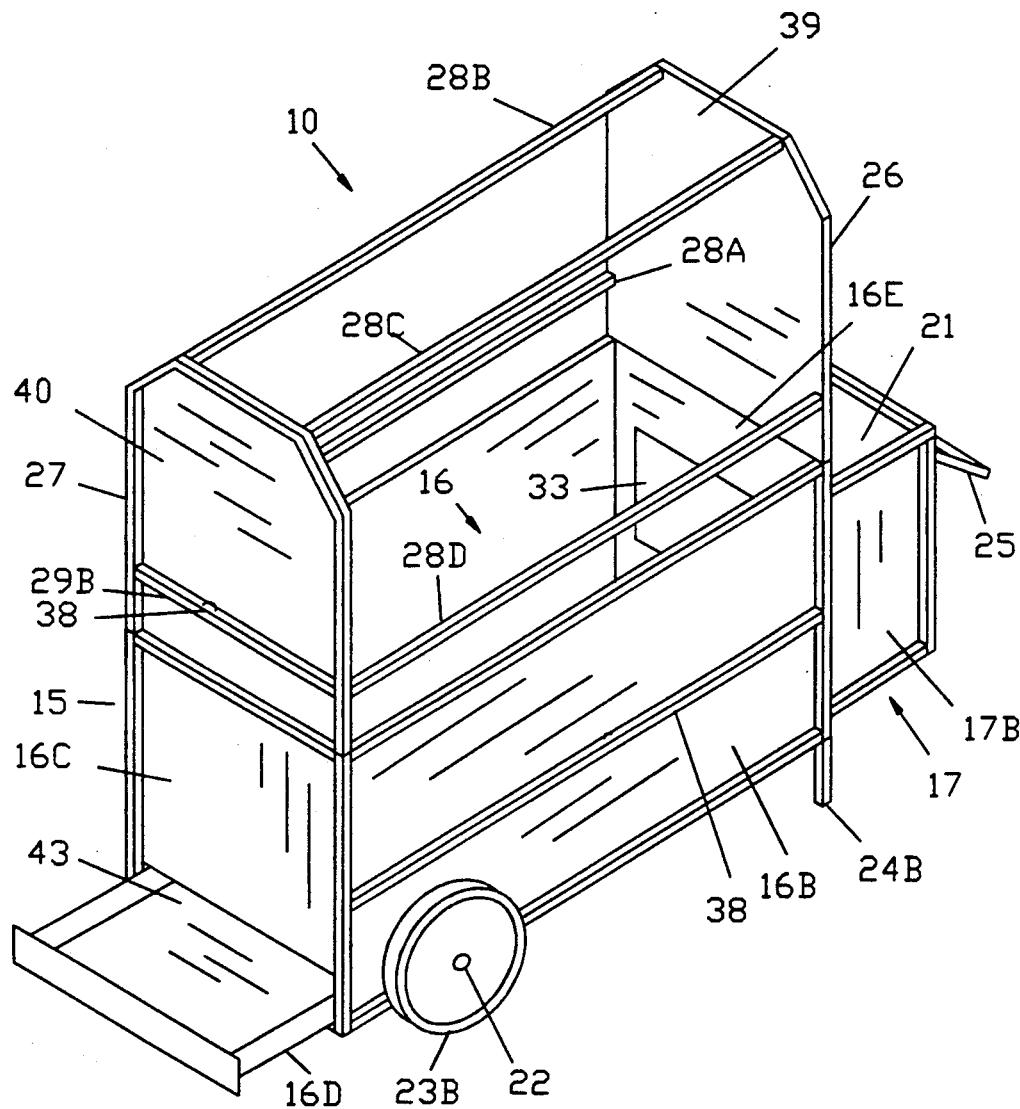
FIG. 5 is a rear perspective view of the calf dryer apparatus showing the slidable bottom wall extended to the outside of the apparatus.

As shown in FIG. 5, the bottom wall of the calf-receiving compartment is slidable upon two rail members (not shown) extending along the bottom of the two side walls 16a & 16b of the calf-receiving compartment 16 and is slidable through a transverse opening 43 along the bottom edge of the back end wall 16c of the calf-receiving compartment 16 and is slidable to the outside of the container 15 for easy cleaning and removing the droppings from the calf.

As shown in FIGS. 3 and 4, a heater unit means 44, either battery-operated, gas-operated or electrically-powered, is removeably positioned on the bottom wall 17c of the heater unit-storing compartment 17 to generate heated air which passes through a transversely-extending vent 33 below the bottom of the common wall 16e & 17e between the two compartments 16 & 17, and passes into and warms the calf-receiving compartment 16 to dry and warm the calf lying or standing upon the mesh-like platform 30. If the heater unit means 44 is electrically-powered, the heater unit means 44 is connected by an electric cord to a power source to energize the heater unit means 44. The calf dryer apparatus 10 can be moved upon its wheels 23a & 23b to any located as desired by the user. If the dryer apparatus 10 is transported to an open pasture or the like where there is no shelter to block out the elements of the environment, the user has the option of insertably mounting the arch-like frame means 26 & 27 on top of the container 15 and draping the canvas hood 36 about the frame means 26 & 27 to substantially shelter a calf placed in the calf-receiving compartment 17 from the elements of the environment. To dry and warm a calf, the user picks up the calf and places the calf on the mesh-like platform 30 in the calf-receiving compartment 16 through the top of the compartment 16. If desired, the user can then drape the canvas hood 36 about the top of the calf-receiving compartment 16 to block out the elements of the environment and also to retain the heated air generated by the heater unit means 44 which can be energized before or after the calf is placed on the mesh-like platform 30. Once the calf is substantially dried and warmed and substantially regains its energy, the calf will probably attempt to stand or will stand on the platform 30 in the compartment 16. At which point, the user can remove the canvas hood 26 from the top of the calf-receiving compartment 16, if the hood 36 was used, and lift the calf up through the top of the compartment 16 and out of the container 15.

Various changes and departures may be made to the invention without departing from the spirit and scope thereof. Accordingly, it is not intended that the invention be limited to that specifically described in the specification or as illustrated in the drawing but only as set forth in the claims.

What is claimed is:

1. A portable calf dryer apparatus comprising:
    a durably-constructed container fixedly mounted upon wheel and leg means and having a calf-receiving compartment and a heater unit-storing compartment, each of said compartments having side, end, and bottom walls and further having an open top, said container further having a plurality of slots extending downwardly through top edges along said end walls of said calf-receiving compartment, said top end of said heater unit-storing compartment coverable by a lid hingedly attached to a top edge thereof, for easy transportability of said calf dryer apparatus on a ground surface;
    a mesh-like platform removeably and horizontally suspended inside said calf-receiving compartment and elevated above said bottom wall of said container, to support a calf thereupon and to substantially pass droppings from and about said calf to said bottom wall of said calf-receiving compartment;
    a handle member fixedly attached to the exterior of an end of said container for conveniently moving and positioning said dryer apparatus as desired by a user; and
    a heater unit means stored in said heater unit-storing compartment, capable of generating heated air for said calf-receiving compartment to dry and warm said calf.

2. A portable calf dryer apparatus as described in claim 1, wherein said bottom wall of said calf-receiving compartment is slidably and removeably mounted thereunder, to function as a slidable tray upon which droppings from said calf are received and from which said droppings can be easily removed from said container.

3. A portable calf dryer apparatus as described in claim 1, wherein said mesh-like platform is removeably suspended inside said calf-receiving compartment by a plurality of elongate platform-suspending bracket members fixedly attached near corners of said platform and extending upwardly therefrom and mountably engageable with top edges of said calf-receiving compartment, to facilitate removeably suspending said platform inside said calf-receiving compartment and for ease of cleaning said platform.

4. A portable calf dryer apparatus as described in claim 3, wherein said mesh-like platform is removeably and centrally disposed inside said calf-receiving compartment, relative to said bottom wall and said top edges of said calf-receiving compartment, to protect said calf placed on said platform from the elements of the environment and to generally separate said calf from said droppings.

5. A portable calf dryer apparatus as described in claim 1 further comprises
    two arch-like frame means removeably mounted upright in said slots and interconnectively stabilized by two longitudinal members;
    two panel members similarly configured to said frame means and fixedly attached to said frame means; and
    a flexible hood capable of being mounted and fastened about said frame means above said calf-receiving compartment to further shelter said calf from the elements of the environment.

6. A portable calf dryer apparatus as described in claim 1, wherein said compartments are separated by a common wall and interconnected by a vent through a bottom thereof, through which heated air generated by said heater unit means enters said calf-receiving compartment from said heater unit-storing compartment to dry and warm said calf.

* * * * *